United States Patent
Casey et al.

(10) Patent No.: US 9,328,004 B2
(45) Date of Patent: May 3, 2016

(54) DETERMINING BIOFILM THICKNESS IN A MEMBRANE SUPPORTED BIOFILM REACTOR

(71) Applicant: University College Dublin, National University of Ireland, Dublin, Dublin (IE)

(72) Inventors: Eoin Casey, Dublin (IE); Eoin Syron, Ballina (IE); Barry Heffernan, Galway (IE)

(73) Assignee: University College Dublin, National University of Ireland, Dublin, Dublin (IE)

( * ) Notice: Subject to any disclaimer, the term of this patent is extended or adjusted under 35 U.S.C. 154(b) by 0 days.

(21) Appl. No.: 14/188,631

(22) Filed: Feb. 24, 2014

(65) Prior Publication Data

US 2014/0262984 A1 Sep. 18, 2014

Related U.S. Application Data

(62) Division of application No. 13/131,605, filed as application No. PCT/IE2009/000081 on Nov. 25, 2009, now Pat. No. 8,696,913.

(30) Foreign Application Priority Data

Nov. 27, 2008 (EP) .................................... 08105882

(51) Int. Cl.
*B01D 61/12* (2006.01)
*B01D 65/10* (2006.01)
(Continued)

(52) U.S. Cl.
CPC ................ *C02F 3/006* (2013.01); *B01D 61/12* (2013.01); *B01D 65/10* (2013.01); *C02F 3/102* (2013.01);
(Continued)

(58) Field of Classification Search
CPC ........ B01D 61/02; B01D 61/10; B01D 61/12; B01D 63/02; B01D 65/02; B01D 65/10; B01D 69/08; B01D 2311/26; B01D 2311/14; B01D 2311/16; B01D 2321/00; B01D 2321/40; B01D 2321/18
See application file for complete search history.

(56) References Cited

U.S. PATENT DOCUMENTS

| 5,725,776 A * | 3/1998 | Kenley et al. ................. 210/646 |
| 2006/0163157 A1 * | 7/2006 | Cote et al. ..................... 210/615 |
| 2009/0008331 A1 * | 1/2009 | Wilt et al. ..................... 210/647 |

OTHER PUBLICATIONS

Schmid et al. A photoacoustic technique for depth-resolved in situ monitoring of biofilms. Environ. Sci. Technol. (2002) 36, 4135-4141.*

(Continued)

*Primary Examiner* — Katherine Zalasky
(74) *Attorney, Agent, or Firm* — Cotman IP Law Group, PLC

(57) ABSTRACT

A method of assessing biofilm thickness in a membrane supported biofilm reactor (MSBR) of the type comprising a lumen containing a gas phase, a liquid phase, and a gas permeable membrane providing an interface between the gas and liquid phases, the method comprising the steps of charging the lumen with an inert gas, closing the lumen to establish an initial elevated pressure in the lumen, measuring the rate of change of pressure within the lumen, and correlating the rate of change of pressure (dP/dt) with biofilm thickness. The step of correlating dP/dt with biofilm thickness involves correlating dP/dt with the rate of diffusion of the inert gas (dn/dt), correlating dn/dt with an overall mass transfer coefficient (K), correlating K with the mass transfer coefficient of the biofilm ($k_B$), and correlating $k_B$ with the biofilm thickness. Also described is a membrane supported biofilm reactor (MSBR) of the type comprising a gas permeable membrane providing an interface between a lumen containing a gas phase, and a liquid phase, characterized in that the MSBR comprises means for flushing the lumen with an inert gas, means for closing and re-opening the lumen, and means for detecting intra-membrane pressure within the lumen. The means for detecting intra-membrane pressure is provided by a pressure transducer.

9 Claims, 2 Drawing Sheets

(51) Int. Cl.
  *B01D 65/02* (2006.01)
  *B01D 63/02* (2006.01)
  *G01B 13/06* (2006.01)
  *C02F 3/00* (2006.01)
  *C02F 3/10* (2006.01)
  *B01D 61/10* (2006.01)
  *B01D 69/08* (2006.01)

(52) U.S. Cl.
  CPC ............... *G01B 13/06* (2013.01); *B01D 61/10* (2013.01); *B01D 63/02* (2013.01); *B01D 65/02* (2013.01); *B01D 69/08* (2013.01); *B01D 2311/14* (2013.01); *B01D 2311/16* (2013.01); *B01D 2311/26* (2013.01); *B01D 2321/18* (2013.01); *B01D 2321/40* (2013.01); *Y02W 10/15* (2015.05)

(56) References Cited

OTHER PUBLICATIONS

Zhang et al. Determination of pollutant diffusion coefficients in naturally formed biofilms using a single tube extractive membrane reactor. Biotechnology and Bioengineering, vol. 59, No. 1 (1998) 80-89.*

Pavasant et al. Prediction of optimal biofilm thickness for membrane-attached biofilms growing in an extractive membrane bioreactor. Biotechnology and Bioengineering, vol. 52, No. 3 (1996) 373-386.*

Casey et al. Biofilm development in a membrane-aerated biofilm reactor: Effect of intra-membrane oxygen pressure on performance. Bioprocess Engineering 23 (2000) 476-486.*

* cited by examiner

DETERMINING BIOFILM THICKNESS IN A MEMBRANE SUPPORTED BIOFILM REACTOR

CROSS-REFERENCE TO RELATED APPLICATIONS

This application is a continuation of U.S. patent application Ser. No. 13/131,605, filed on Jul. 21, 2011, which is the National Stage of International Application No. PCT/IE2009/000081, filed on Nov. 25, 2009, which claims the priority of European Application No. 08105882.8, filed on Nov. 27, 2008, the contents of which are hereby incorporated by reference in their entirety.

INTRODUCTION

The invention relates to a method of assessing biofilm thickness in a membrane supported biofilm reactor. The invention also relates to a membrane supported biofilm reactor.

The operating principle of a conventional membrane supported biofilm reactor is shown in FIG. 1 (comparative). A liquid wastewater containing organic pollutants is in contact with a biofilm (2) which is supported on a gas permeable membrane (3). The membrane lumen (4) contains air, pure oxygen gas, hydrogen or other gas which serves and an electron donor or acceptor when used to oxidize or reduce certain pollutant. Oxygen or other gases may permeate through the membrane by a process of molecular diffusion. The membrane provides a support surface for the biofilm and allows oxygen or other gases to be supplied to the biofilm without bubble formation. The reactor may consist of a number of tubular membranes (sometimes referred to as a hollow fiber unit). The number of fibers may be adjusted to provide a desired surface area for biofilm growth.

The biofilm thickness will vary with time, but is desired to be between 200 and 800 micrometers. It is necessary to ensure that the biofilm thickness does not exceed the desired thickness in order to prevent blockage of the hollow fiber reactor. In order to quantify the biofilm thickness and to measure the effect of biofilm thickness on the performance of the bioreactor, the Applicant has previously described a single tube hollow fiber reactor, shown in FIG. 2 (comparative), which shows the biofilm (6) in contact with the wastewater (5). In this configuration it is possible to measure biofilm thickness using a simple optical method through the glass walled membrane unit (Casey, E., B. Glennon, and G. Hamer, *Oxygen mass transfer characteristics in a membrane-supported biofilm reactor*. Biotechnology and Bioengineering, 1999. 62(2): p. 183-192). However, this method is only suitable for a laboratory scale system and is unsuitable for a commercial embodiment of the reactor. Since the biofilm thickness may exceed the desired thickness it is important to be able to determine the thickness at and desired time.

It is an object of the invention to overcome at least one of the above-referenced problems.

STATEMENTS OF INVENTION

Broadly, the invention relates to a method of measuring the thickness of a biofilm layer formed on a membrane of a membrane supported biofilm reactor (MSBR). These are reactors for treating wastewater liquids to remove carbonaceous pollutant removal, nitrify/denitrify the pollutants, and/or perform xenobiotic biotreatment of the wastewater constituents, and they generally employ an air/oxygen/hydrogen permeable membrane that provides an interface between the fluid to be treated (fluid phase) and an air/oxygen/hydrogen supply (gas phase). Typically, a biofilm consisting of a heterogeneous population of bacteria (generally including nitrifying, denitrifying, and heterotrophic, bacteria) grows on the fluid phase side of the biofilm. In use, an electron acceptor or donor gaseous element, generally an oxygen-containing gas such as air or oxygen, or hydrogen, is charged into the gas phase whereupon some of the air/oxygen/hydrogen diffuses through the permeable membrane into the biofilm where it is employed by the bacteria in one or more of the processes mentioned above. Waste gases from the biofilm (i.e. $CO_2$) pass back into the fluid and pass into the gas phase through the membrane. The invention relates to a method of measuring biofilm thickness which employs the rate of change of intra-membrane pressure as a diagnostic variable of biofilm thickness. The method generally involves closing the gas phase (such that air/oxygen/hydrogen is no longer in flux through the gas phase) and establishing an elevated pressure in the closed gas phase (pressure greater than atmospheric). Typically, the gas phase will be charged with an inert gas such as argon prior to closing the gas phase. A sensitive pressure measurement means then takes a measurement of the rate of change of the intra-membrane pressure (dP/dt) under these conditions, and this is then correlated with biofilm thickness.

According to the invention, there is provided a method of assessing biofilm thickness in a membrane supported biofilm reactor (MSBR) of the type comprising a lumen containing a gas phase, a liquid phase, and a gas permeable membrane providing an interface between the gas and liquid phases, the method comprising the steps of:

optionally charging the lumen with an inert gas;
  establishing an initial elevated pressure in the lumen;
  measuring the rate of change of pressure (dP/dt) within the lumen; and
  correlating the rate of change of pressure (dP/dt) with biofilm thickness.

Typically, the step of establishing an initial elevated pressure in the lumen involves an initial step of closing the lumen.

In one embodiment of the invention, the step of correlating dP/dt with biofilm thickness involves:

correlating dP/dt with the rate of diffusion of the inert gas (dn/dt);
  correlating dn/dt with an overall mass transfer coefficient (K);
  correlating K with the mass transfer coefficient of the biofilm ($k_B$); and
  correlating $k_B$ with the biofilm thickness.

The method of the invention may be applied to any type of membrane-attached biofilm reactor including a hydrogen-based membrane biofilm reactor (in which the gaseous element comprises hydrogen) or a membrane biofilter. The method is especially suitable for hollow fibre MSBR's in which the gas phase is contained within hollow fibres having a lumen through which the electron acceptor gaseous element passes, generally at elevated pressure.

The rate of change of pressure within the lumen is measured using a pressure transducer, especially a pressure transducer capable of measuring pressure in a range of 0 to 10 bar, 0 to 5 bar, 0 to 2 bar, and ideally 0 to 1 bar, gauge. In a preferred embodiment of the invention, the pressure transducer is capable of measuring pressure in the range 0.1 to 2.0 bar, ideally 0.1 to 1.0 bar. Examples of suitably sensitive pressure transducers include mechanical deflection sensors, strain gauge based sensors or variable capacitance sensors, the details of which will be known to those skilled in the art In an embodiment in which the gas phase is charged with inert gas, the inert gas is preferably selected from the group comprising: argon; helium; neon, krypton; xenon; and radon.

In a preferred embodiment of the invention, the gas phase comprises an oxygen-containing gas. Ideally, the oxygen-containing gas is oxygen or air.

Typically, the initial elevated pressure in the lumen is at least 0.01 bar, suitably from 0.01 to 10 bar, typically from 0.05 to 5 bar, and preferably from 0.1 to 1.0 bar. Ideally, the initial elevated pressure in the lumen is at least 0.01, 0.02, 0.03, 0.04, 0.05, 0.06, 0.07, 0.08, 0.09 or 0.1 bar. Suitably, the initial elevated pressure in the lumen is not greater than 10, 9, 8, 7, 6, 5, 4, 3, 2, or 1 bar. The term "initial elevated pressure" should be taken to mean the initial pressure reading used in the dP/dt calculation.

The invention also relates to a method of operating a membrane supported biofilm reactor comprising the step of periodically assessing biofilm thickness in the reactor using a method of the invention, and optionally initiating a cleaning procedure to remove excess biofilm when the biofilm thickness is determined to be above a thickness threshold value.

The term "thickness threshold value" for the biofilm should be taken to mean the thickness of biofilm which results in the biofilm functioning non-optimally. In most cases this will generally be taken to mean the oxygen penetrating depth for the membrane on which the biofilm is growing. However, in the case of certain non-uniform or non-standard membranes, such as for example anioxic membranes, the thickness threshold value for the membrane will be a value greater than the oxygen penetrating depth for that membrane.

Typically, the biofilm thickness is assessed at an interval of at least: 1 hour; 2 hours; 3 hours; 5 hours; 7 hours; 10 hours; 12 hours; 15 hours; 20 hours; 24 hours; 30 hours; 40 hours; and 48 hours. Ideally, the biofilm thickness is assessed at least every twelve hours.

Typically, the cleaning procedure is a two phase flow cleaning procedure. However, other methods of cleaning biofilms from membranes of biofilm reactors are also envisaged, including partial draining and power wash.

In one embodiment of the invention, the step of assessing biofilm thickness last no longer than 10 minutes, typically no longer than 7 minutes, and ideally no longer than 5 minutes.

In one embodiment, the methods of the invention employs processing means adapted to:
receive pressure readings from the pressure transducer;
calculates a dP/dt value; and
correlate the dP/dt value with a biofilm thickness value.
Suitably, the processing means is adapted to:
compare the biofilm thickness value with a pre-set thickness threshold value; and
when the biofilm thickness value is greater that the pre-set thickness threshold value, provide an indication that a cleaning procedure is required.

Preferably, the processing means is adapted to actuate a cleaning procedure when the biofilm thickness value is above the pre-set thickness threshold value.

Generally, the processing means is capable of storing a number of different pre-set thickness threshold values, which correlate with threshold values for different types of biofilms, different types of reactors, and different types of effluent being treated. At the start of a wastewater treatment operation, an operator can choose one of the pre-set threshold values that most closely matches the reactor type or operating conditions, or can calculate the threshold value.

There is also provided a computer program comprising program instructions for causing a computer program to carry out any of the above methods which may be embodied on a record medium, carrier signal or read-only memory.

The invention also relates to a membrane supported biofilm reactor (MSBR) of the type comprising a gas permeable membrane providing an interface between a gas phase lumen containing a gas phase, and a liquid phase, characterised in that the MSBR comprises means for flushing the lumen with an inert gas, means for closing and re-opening the lumen, and means for detecting intra-membrane pressure within the lumen.

In one embodiment, the means for detecting intra-membrane pressure is provided by a pressure transducer, typically a pressure transducer capable of measuring pressures in a range of 0 to 10 bar, 0 to 5 bar, 0 to 2 bar, and ideally 0 to 1 bar, gauge. In a preferred embodiment of the invention, the pressure transducer is capable of measuring pressure in the range 0.1 to 2.0 bar, ideally 0.1 to 1.0 bar.

In one embodiment, the gas permeable membrane is in the form of a hollow fibre in which the gas phase is located within the lumen of the fibre.

Typically, the hollow fibre passes through a vessel adapted to contain the liquid phase, and wherein the transducer communicates with a part of the hollow fibre that is located externally of the vessel.

Suitably, the MSBR comprises a processor adapted to:
receive pressure readings from the pressure measurement means, typically the pressure transducer;
calculates a dP/dt value; and
correlate the dP/dt value with a biofilm thickness value.
Preferably, the processor is adapted to:
compare the biofilm thickness value with a pre-set thickness threshold value; and
when the biofilm thickness value is greater that the pre-set thickness threshold value, provide an indication that a cleaning procedure is required.
Ideally, the processor is adapted to:
actuate a cleaning procedure when the biofilm thickness value is above the pre-set thickness threshold value.

In one embodiment, the MSBR comprises a membrane cleaning apparatus such as, for example, two-phase cleaning apparatus. In one embodiment, the membrane cleaning apparatus is operatively connected to the processor such that the cleaning apparatus is actuated when the processor detects that the biofilm thickness value is above the pre-set thickness threshold value.

The invention also provides a computer program comprising program instructions for causing a computer to perform any one of the methods of the invention. The computer program may be embodied on a record medium such as a carrier signal, or a read-only memory.

The invention also provides a computer implemented system for assessing biofilm thickness in a membrane supported biofilm reactor (MSBR) of the type comprising a lumen containing a gas phase, a liquid phase, and a gas permeable membrane providing an interface between the gas and liquid phases, the system comprising:
means for charging the lumen with an inert gas;
means for closing the lumen to establish an initial elevated pressure in the lumen;
means for measuring the rate of change of pressure within the lumen; and
means for correlating the rate of change of pressure (dP/dt) with biofilm thickness.
Suitably, the system comprises:
means for correlating dP/dt with the rate of diffusion of the inert gas (dn/dt);

means for correlating dn/dt with an overall mass transfer coefficient (K);

means for correlating K with the mass transfer coefficient of the biofilm ($k_B$); and means for correlating $k_B$ with the biofilm thickness.

In one embodiment, the system further includes means for actuating a biofilm cleaning procedure when the measured biofilm thickness exceeds a biofilm threshold value.

Thus, the invention relates to a method of assessing the thickness of a biofilm formed on the membrane of a membrane-supported biofilm reactor, which method employs the rate of change of intra-membrane pressure as a diagnostic variable of biofilm thickness.

The invention also relates to a method of assessing the thickness of a biofilm formed on the membrane of a membrane-supported biofilm reactor, which method employs the rate of change of intra-membrane pressure as a diagnostic variable of biofilm thickness, wherein the rate of change of pressure is measured while a lumen of the membrane is flushed with an inert gas.

The invention also relates to the use of intra-membrane pressure change as a means of determining the thickness of a biofilm formed on the membrane of a membrane-supported biofilm reactor.

BRIEF DESCRIPTION OF THE FIGURES

The invention will be more clearly understood from the following description of an embodiment thereof, given by way of example only, in which FIG. 1 (comparative) is a schematic illustration of the membrane of a membrane supported biofilm reactor (MSBR) providing an interface between the lumen of the gas phase and the liquid phase, and showing the flux of components across the membrane and biofilm.

DETAILED DESCRIPTION OF THE INVENTION

The invention relates to membrane-supported biofilm reactors, and more particularly to self-cleaning biofilm reactors, and method of operating and/or cleaning such reactors. The invention is based on the use of intra-membrane pressure as a means of determining biofilm thickness. Thus, in one example of a method of the invention, the method comprises the steps of flushing the membrane with an inert gas, taking a dP/dt value within the membrane, and correlating the dP/dt value with biofilm thickness. Suitably, the method also involves correlating the thus-obtained biofilm thickness with a pre-set biofilm thickness threshold value, and when the test value exceeds the threshold (reference) value, providing an indication that a cleaning operation is required and/or initiating a cleaning operation. Various means are known within the literature for cleaning membranes of MSBR's, and the invention is not limited to any particular method.

The invention also relates to a biofilm reactor, especially a MSBR, that is adapted to enable charging of the lumen of the membrane with an inert gas at an elevated pressure, and comprises pressure measuring means capable of measuring intramembrane pressure changes, and a processor adapted for correlating the intramembrane pressure changes with biofilm thickness. Suitably, the reactor includes means for closing the lumen, generally after it has been charged with inert gas. For example, the reactor may be provided with valves which can be actuated to close each end of the lumen. The processor ideally is capable of processing the data from the pressure measuring means to provide a dP/dt value. Suitably, the processor is capable of correlating the dP/dt value with a biofilm thickness. Generally, the processor is capable of comparing the biofilm thickness value with a pre-set biofilm thickness threshold value and, when the test value exceeds the threshold value, (a) providing an indication that a cleaning operation is required, and/or (b) initiating a suitable cleaning operation. In one embodiment, the cleaning operation may be chosen from a number of different cleaning operations, from for example, mild cleaning operations to extensive cleaning operations. Suitably, the processor is capable of selecting a suitable cleaning operation depending on a function of the test thickness value and reference thickness value. Thus, for example, if the function of test and reference value is a ratio (test: reference), then the processor may be adapted to correlate higher ratio values with more prolonged or extensive cleaning operations.

Determination of Biofilm Thickness Via an Inert Gas Pressure Technique

Figure 1:
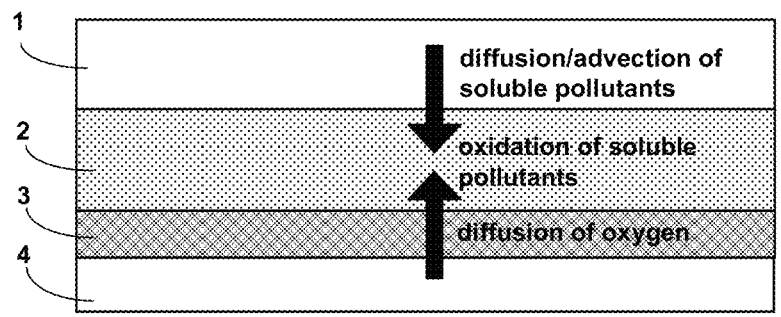
Figure 2:
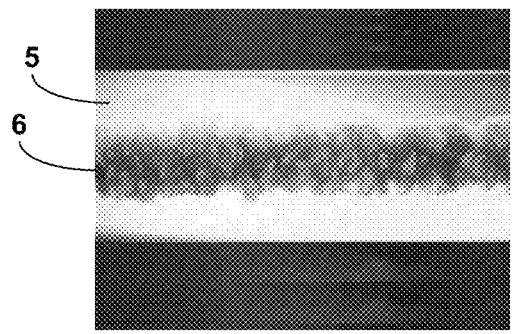
FIG. 2 (comparative) is a picture of a hollow fibre forming part of a hollow fibre MSBR and showing the lumen of the gas phase, the liquid phase, the membrane, and the biofilm growth on the membrane.
Figure 3:
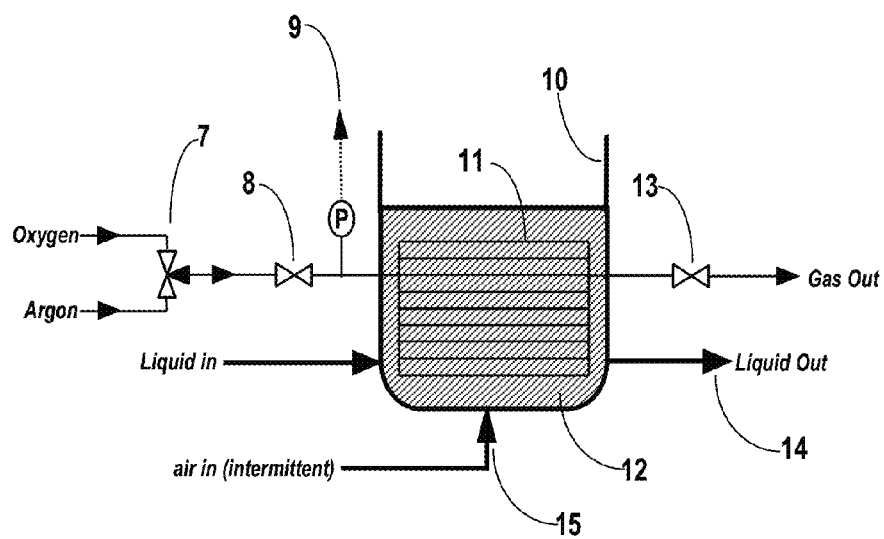
FIG. 3 is an illustration of a membrane supported biofilm reactor of the invention.

A process sensing technique was developed to allow rapid determination of biofilm thickness at any desired time point in a continuously operating membrane biofilm reactor. Referring to FIG. 3 which shows a membrane unit (11) inserted in a tank (10) containing liquid wastewater (12).

Oxygen containing gas is supplied to the membrane lumen except for an occasional period, typically a few minutes in a 24 hour cycle, when the thickness sensing procedure takes place. Through the use of an automatic three-way-valve, the gas in the membrane lumen is replaced by the inert gas, for example, Argon, at an elevated pressure (typically between 0.1 bar and 1 bar). When the lumen contains only the inert gas, the valves 8 and 13 are simultaneously closed. The inert gas is transported by molecular diffusion across the membrane, into the biofilm and into the liquid phase. The intra-membrane pressure is monitored by a precise pressure transducer (9). Using the ideal gas law, the rate of diffusion of the inert gas (dn/dt) in moles/s can be determined by analysis of the time dependent pressure readings (dP/dt).

$$\frac{dP}{dt} = \frac{dn}{dt}\left(\frac{RT}{V}\right)$$

where P is pressure, T is temperature (K), V is the total fixed volume of the membrane lumen, which can be assumed constant and R is the gas constant.

The rate of diffusion (dn/dt) of the inert gas from the membrane lumen to the bulk liquid is directly proportional to an overall mass transfer coefficient, K.

$$\frac{dn}{dt} = AK(C_i^* - C_i)$$

where A is the total membrane area, $C_i^*$ is the solubility of the inert gas in the liquid at the prevailing temperature and $C_i$ is the concentration of the inert gas in the bulk liquid.

This overall mass transfer coefficient (K) is, in turn, related to three principal mass transfer coefficients corresponding to the membrane ($k_M$), the liquid boundary layer ($k_L$) and the biofilm ($k_B$).

$$\frac{1}{K} = \frac{1}{k_M} + \frac{1}{k_L} + \frac{1}{k_B}$$

Both $k_M$ and $k_L$ can be assumed constant and can easily be determined before the start-up of the reactor when biofilm is not present.

Under normal operating conditions the resistance to mass transfer of the biofilm is variable and is linearly dependent on the average biofilm thickness.

$$k_B = \frac{D_{i,B}}{L_B}$$

where $D_{i,B}$ is the diffusion coefficient of the inert gas in the biofilm (and can be reasonably assumed to be constant) and $L_B$ is the biofilm thickness.

In summary, the dynamic pressure measurements can be used to estimate the biofilm thickness. An example of this calculation is as follows:

EXAMPLE

In a single tube MSBR, with a fully developed *Pseudomonas fluorescens* biofilm, the membrane lumen was filled with Argon at a pressure of 0.1 bar gauge. Under sealed conditions the rate of pressure change was measured and found to be 16.63 Pa/s.

According to the following equation dn/dt can be calculated $$\frac{dn}{dt} = \frac{dP}{dt}\left(\frac{RT}{V}\right)^{-1}$$

with $V=9.41\times10^{-7}$ m$^3$, dn/dt is $6.22\times10^{-9}$ mol/s
K can be calculated as follows $$K = \frac{\frac{dn}{dt}}{A(C_i^* - C_i)}$$

A is 0.0028 m$^2$, $C_i^*$ is 1.55 mol/m$^3$ and $C_i$ can be assumed to be zero, giving a value of $1.42\times10^{-6}$ m/s for K.

For this reactor $k_L$ was found to be $4.0\times10^{-5}$ m/s and $k_M$ was found to be $6.0\times10^{-5}$ m/s.

According to the following equation $$\frac{1}{K} = \frac{1}{k_M} + \frac{1}{k_L} + \frac{1}{k_B}$$

$k_B$ can be calculated to be $1.5\times10^{-6}$ m/s
Biofilm thickness ($L_B$) is related to $k_B$ by the following equation:

$$L_B = \frac{D_{i,B}}{k_B}$$

Where $D_{i,b}$ is the diffusion coefficient of Argon in the biofilm and was calculated assuming that the diffusivity in the biofilm is 60% of that in pure water, giving a value of $2.4\times10^{-9}$ m$^2$/s. This gives a biofilm thickness of 1590 μm. An optical technique was also used to measure biofilm thickness, as a means of validating the inert gas sensing method and was found to be 2000 μm±200 μm. The agreement between to two values is at an acceptable level.

Thickness Threshold Value

Above a certain critical threshold value of biofilm thickness it is necessary to initiate a cleaning procedure to remove excess biofilm. Determination thickness at any time point can be determined as described above, but the actual threshold value is system specific and depends primarily on the depth of penetration of oxygen into the biofilm. Oxygen penetration depth (a) can be estimated from the following equation:

$$a = (2D_e S_o/k_o)^{1/2},$$

where $D_e$ is the effective diffusion coefficient of the oxygen in the biofilm, $S_o$ is the oxygen concentration at the biofilm-membrane interface and $k_o$ is the volumetric reaction rate of oxygen in the biofilm in the biofilm.

EXAMPLE

Estimates of each of these parameters were made to allow the calculation of oxygen penetration depth. The effective diffusion coefficient of oxygen in biofilm at 30° C. was taken as 60% of the diffusion coefficient of pure water at this temperature, or $1.5\times10^{-5}$ cm$^2$s$^{-1}$. The concentration of dissolved oxygen at the biofilm-membrane interface was taken as 40.0 mg liter$^{-1}$, and the volumetric consumption rate of oxygen ($k_O$) was determined experimentally to be 1.1 g m$^{-3}$s$^{-1}$. From these estimates the calculated depth of oxygen penetration into the biofilm from the membrane was found to be 380 μm. The oxygen penetration depth is dependent on a number of parameters, particularly the volumetric reaction rate of oxygen ($k_O$), which is in turn dependent on the biofilm density (X), the specific growth rate of the microorganisms (μ) and the yield of biomass on substrate (Y). The following equation can be used to estimate $k_O$ $$k_O = \frac{\mu}{Y}X$$

For typical wastewater treatment applications, values of the parameters, X, Y and μ are generally known based on plant data analysis or pilot studies. Accordingly, the oxygen penetration depth and thus the threshold value for the initiation of biofilm thickness control can be determined.

Biofilm Removal

Referring to FIG. 3, to control the thickness of the biofilm one or more aerators (15) are provided below the membrane unit (11) and connected to a scouring air blower. Air bubbles emerge from the aerator and rise through the membrane unit (11) and remove physically some or all of the biofilm from the membranes. A substantial fraction of the biofilm will be removed over a short time period (typically minutes). At the end of the cleaning cycle, the gas-liquid flushing stream is disconnected and normal continuous operation recommences.

The embodiments in the invention described with reference to the drawings comprise a method of measuring biofilm thickness in a membrane-supported biofilm reactor, and a membrane-supported biofilm reactor having biofilm thickness detection means. In one embodiment, the reactor includes processing means for correlating intra-membrane pressure changes with biofilm thickness. However, the invention also extends to computer programs, particularly computer programs stored on or in a carrier, adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described which may be varied in construction and detail without departing from the spirit of the invention.

The invention claimed is:

1. A membrane supported biofilm reactor (MSBR) of the type comprising a gas permeable membrane providing an interface between a lumen containing a gas phase, and a liquid phase, characterised in that the MSBR comprises a gas supply stream coupled to the gas phase of the lumen for flushing the lumen with an inert gas, one or more valves coupled to the lumen for closing and re-opening the lumen, a pressure transducer coupled to a gas phase of the membrane for detecting intra-membrane pressure within the lumen, and a processor programmed to receive pressure readings from the pressure transducer; calculate a rate of change of pressure with time (dP/dt) value; and use the dP/dt value to calculate a biofilm thickness value.

2. The MSBR as claimed in claim 1, wherein one of said one or more valves is coupled to each end of the lumen.

3. The MSBR as claimed in claim 1, wherein the gas permeable membrane is in the form of a hollow fibre in which the gas phase is located within the lumen of the fibre.

4. The MSBR as claimed in claim 1, wherein the processor is programmed to:
compare the biofilm thickness value with a pre-set thickness threshold value; and
actuate a cleaning procedure when the biofilm thickness value is above the pre-set thickness threshold value.

5. The MSBR as claimed in claim 1, wherein the processor is programmed to:
compare the biofilm thickness value with a pre-set thickness threshold value; and
when the biofilm thickness value is above the pre-set thickness threshold value, provide an indication that a cleaning procedure is required.

6. The MSBR as claimed in claim 5, further comprising a membrane cleaning apparatus and in which the membrane cleaning apparatus is operatively connected to the processor such that the cleaning apparatus is actuated when the processor detects that the biofilm thickness value is above the pre-set thickness threshold value.

7. A system for assessing biofilm thickness in a membrane supported biofilm reactor (MSBR) of the type comprising a lumen containing a gas phase, a liquid phase, and a gas permeable membrane providing an interface between the gas and liquid phases, the system comprising:
a gas supply stream coupled to the lumen for charging the lumen with an inert gas;
a valve at each end of the lumen for closing the lumen to establish an initial elevated pressure in the lumen;
a pressure transducer for measuring the rate of change of pressure within the lumen; and
a processor programmed to use the rate of change of pressure (dP/dt) to compute biofilm thickness.

8. The system as claimed in claim 7, wherein computing said biofilm thickness comprises:
applying dP/dt to calculate a rate of diffusion of the inert gas (dn/dt) through equation $$\frac{dn}{dt} = \frac{dP}{dt}\left(\frac{RT}{V}\right)^{-1};$$

using dn/dt to calculate an overall mass transfer coefficient (K) through equation $$K = \frac{\frac{dn}{dt}}{A(C_i^* - C_i)};$$

using K to calculate a mass transfer coefficient of the biofilm ($k_B$) through equation $$\frac{1}{K} = \frac{1}{k_M} + \frac{1}{k_L} + \frac{1}{k_B};$$

and using $k_B$ to calculate the biofilm thickness through equation $$L_B = \frac{D_{i,B}}{k_B},$$

where:
P is pressure,
T is temperature,
V is the total fixed volume of the membrane lumen,
R is the gas constant,
A is the total membrane area,
$C^*_i$ is the solubility of the inert gas in the liquid at the prevailing temperature,
$C_i$ is the concentration of the inert gas in the bulk liquid,
$k_M$ is mass transfer coefficient of the membrane,
$k_L$ is mass transfer coefficient of the liquid boundary layer,
$k_B$ is mass transfer coefficient of the biofilm,
$D_{i,B}$ is the diffusion coefficient of the inert gas in the biofilm, and
$L_B$ is the biofilm thickness.

9. The system as claimed in claim 7, wherein said processor is further programmed to actuate a biofilm cleaning procedure when the measured biofilm thickness exceeds a biofilm threshold value.

* * * * *